United States Patent
Rübenach

(10) Patent No.: US 7,455,445 B2
(45) Date of Patent: Nov. 25, 2008

(54) ARRANGEMENT FOR MIXING FIBERS WITH WEIGHING CONTAINERS BEING ADJUSTABLE RELATIVE TO A MIXING BELT

(75) Inventor: Bernhard Rübenach, Mönchengladbach (DE)

(73) Assignee: Trützschler GmbH & Co. KG, Mönchengladbach (DE)

( * ) Notice: Subject to any disclaimer, the term of this patent is extended or adjusted under 35 U.S.C. 154(b) by 631 days.

(21) Appl. No.: 11/216,189

(22) Filed: Sep. 1, 2005

(65) Prior Publication Data

US 2006/0067161 A1    Mar. 30, 2006

(30) Foreign Application Priority Data

Sep. 30, 2004    (DE)    ........................ 10 2004 048 222

(51) Int. Cl.
*B01F 15/02*    (2006.01)
*D01G 13/00*    (2006.01)

(52) U.S. Cl. .................. 366/141; 366/153.2; 19/145.5; 222/77

(58) Field of Classification Search .................. 366/141, 366/153.2, 18, 154.2; 198/533; 177/56, 177/57; 222/77; 19/145.5
See application file for complete search history.

(56) References Cited

U.S. PATENT DOCUMENTS

| | | | |
|---|---|---|---|
| 3,080,617 A | | 3/1963 | Lytton et al. |
| RE25,609 E | | 6/1964 | Lytton et al. |
| 3,285,580 A | * | 11/1966 | Renaudette ............... 366/153.3 |
| 4,310,060 A | * | 1/1982 | Phillips et al. ................ 177/70 |
| 4,541,144 A | * | 9/1985 | Hoeck ........................ 19/145.5 |
| 6,235,999 B1 | | 5/2001 | Rübenach |
| 7,075,018 B1 | * | 7/2006 | Scholz et al. .................. 177/16 |
| 2006/0067161 A1 | * | 3/2006 | Rubenach .................... 366/141 |

FOREIGN PATENT DOCUMENTS

| | | |
|---|---|---|
| DE | 32 33 246 C2 | 6/1986 |
| DE | 3633700 A1 * | 4/1988 |
| DE | 3916986 A1 * | 11/1990 |
| DE | 4025476 A1 * | 8/1991 |
| DE | 41 30 822 A1 | 3/1993 |
| DE | 198 11 143 A1 | 9/1999 |
| FR | 1413533 A | 11/1965 |
| GB | 919636 | 2/1963 |
| GB | 1036836 | 7/1966 |
| GB | 1098611 | 1/1968 |
| GB | 2 335 206 A | 9/1999 |

OTHER PUBLICATIONS

Preliminary Search Report dated Jan. 30, 2007 U.S. Appl. No. 0509993.

* cited by examiner

*Primary Examiner*—Charles E. Cooley
(74) *Attorney, Agent, or Firm*—Venable LLP; Robert Kinberg

(57) ABSTRACT

In an arrangement for mixing fiber components, for example fiber flocks, especially in spinning preparation, fiber web production or the like, in which the fiber material to be supplied is conveyable into at least two weighing containers and, when weighing is complete, the fiber material is dischargeable from the at least two weighing containers onto a mixing belt, the weighing containers are arranged one after the other—seen in the direction of travel of the belt—above the mixing belt. In order that accurate weighing, troublefree production and increased throughput can be achieved in a simple manner, the position of at least one weighing container can be adjusted transverse to the longitudinal extent of the mixing belt.

30 Claims, 6 Drawing Sheets

I - I

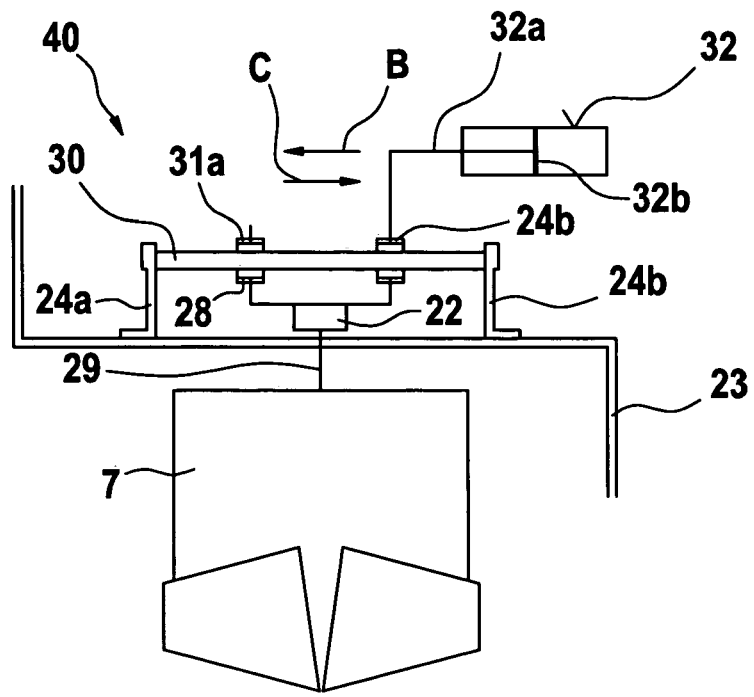
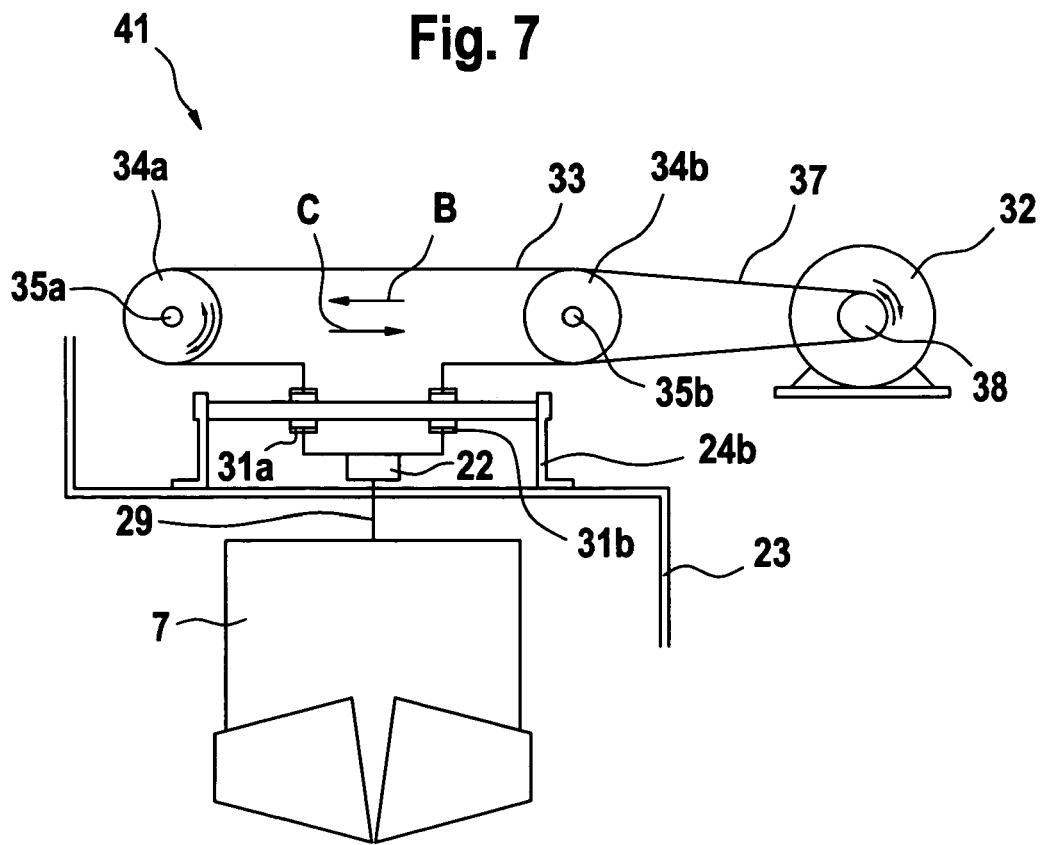

ARRANGEMENT FOR MIXING FIBERS WITH WEIGHING CONTAINERS BEING ADJUSTABLE RELATIVE TO A MIXING BELT

CROSS REFERENCE TO RELATED APPLICATION

This application claims priority from German Patent Application No. 10 2004 048 222.5 dated Sep. 30, 2004, the entire disclosure of which is incorporated herein by reference.

BACKGROUND OF THE INVENTION

The invention relates to an arrangement for mixing fibre components, for example fibre flocks, especially in spinning preparation, fibre web production or the like.

Flock-mixing systems are used for the production of accurate and intensive mixing for spinning and the non-woven industry. The materials mixed are: different synthetic fibres, cotton and synthetic fibres, different recovered waste fibres, cotton and recovered waste fibres. For the spinning of blend yarns of synthetic fibres and carded cotton, in modern spinning works the components are generally mixed in flocks on flock-mixing systems. Such a process results in more intensive mixing.

In a known method, the fibre material to be supplied is conveyable into at least two weighing containers and, when weighing is complete, the fibre material is dischargeable from the at least two weighing containers onto a mixing belt, the weighing containers being arranged one after the other—seen in the direction of travel of the belt—above the mixing belt.

In high-production weighing hopper-feeders, in practice the weighing container, which is generally arranged centrally above the mixing belt, forms a cone of material which, when several machines are arranged one after the other, very quickly results in large accumulations of fibre. At the same time, disadvantageously, there may occur defective weighings caused by incompletely emptied weighing containers and material densities that are too high in the centre, resulting in disruptions in the transport of the material and in the opening at the downstream mixer rollers.

It is an aim of the invention to provide an arrangement of the kind described at the beginning which avoids or mitigates the mentioned disadvantages and which makes it possible in a simple way to achieve accurate weighing, troublefree production and increased throughput.

SUMMARY OF THE INVENTION

The invention provides a fibre mixing system comprising:
a travelling mixing belt; and
at least two weighing containers, arranged one after the other in a direction of travel of the belt, for delivering weighed fibre material onto the belt;

wherein the position of at least one of said weighing containers in a transverse direction relative to the direction of travel of the belt can be adjusted.

The measures taken according to the invention can bring about more uniform deposition or arrangement of the fibre material on the mixing belt. The distribution of the fibre material on the mixing belt can thereby be optimised and the throughput of the weighing hopper-feeder system can be substantially increased.

Advantageously, the position of at least one weighing container can be adjusted in the direction of the transverse extent of the mixing belt. Advantageously, the position of each weighing container can be adjusted. Advantageously, the position of the weighing container(s) can be adjusted in dependence upon one or more parameters selected from the group consisting of the mixing ratio of the fibre contents; the proportions of the fibre components; the mass of the fibre components; and the number of weighing containers.

Advantageously, the at least two weighing containers are movable relative to the mixing belt. Advantageously, the mixing belt is in a fixed position. Advantageously, the at least two weighing containers can be moved, preferably linearly, back and forth above the mixing belt. Advantageously, the at least two weighing containers are displaceable parallel to the mixing belt. Advantageously, for displacing each of the at least two weighing containers, each weighing container is associated with at least one linear drive and/or at least one parallel guide. Where present, the parallel guide may have two guide means (linear guides) coupled to one another to run synchronously. Advantageously, the guide means are associated with side walls of the weighing container that are located opposite one another. Advantageously, the guide means are coupled to one another by a synchronisation shaft. Advantageously, the guide means comprise at least one spindle drive. Advantageously, the guide means comprise at least one pressure cylinder. The pressure cylinder may be, for example, a pneumatic cylinder or a hydraulic cylinder. Advantageously, the pressure cylinder is a three-position cylinder. The guide means may each have a traction mechanism, for example, a chain or a toothed belt, which advantageously circulates around two guide rollers, wheels (for example, sprocket or toothed belt wheels) or the like.

Advantageously, the displacing device is associated with at least one drive device. A manual drive device, for example, a crank wheel or the like, may be present. Advantageously, at least one motor drive device, for example, an electric motor, is present. The drive device may be, for example, a geared motor or a stepping motor. Advantageously, stepless adjustment of the position of the weighing container(s) is provided. Advantageously, actual value feedback from the at least one drive device is provided. The actual value feedback may be a cam plate or the like having an inductive proximity switch. Advantageously, the at least one drive device is connected to an electronic controlling and regulating device, for example, a microcomputer. Advantageously, each weighing device is associated with a position-measuring element (actual value), which is preferably connected to the controlling and regulating device. Advantageously, a desired value memory is connected to the controlling and regulating device. Advantageously, the proportion by weight of each fibre component can be input into the controlling and regulating device. Advantageously, the controlling and regulating device is able to calculate the position of the weighing containers from the proportions by weight of the fibre components and the number of weighing devices. Advantageously, the controlling and regulating device is able to output electrical signals to the drive devices, for example, electric motors, for setting the position of the weighing container(s).

Advantageously, each weighing container is associated with at least one weighing cell or the like, and the weighing container can be displaced together with the at least one weighing cell or the like. Advantageously, on altering the mixing ratio of the fibre components, the position of the weighing containers can be adjusted. Advantageously, a selectable off-centre position of the at least one weighing container is provided. Advantageously, the mixing belt is associated with at least two weighing bale openers. Advantageously, the mixing belt is associated with at least two pneumatically fed weighing feeders.

The invention also provides an arrangement for mixing fibre components, for example, fibre flocks, especially in spinning preparation, fibre web production or the like, in which the fibre material to be supplied is conveyable into at least two weighing containers and, when weighing is complete, the fibre material is dischargeable from the at least two weighing containers onto a mixing belt, the weighing containers being arranged one after the other—seen in the direction of travel of the belt—above the mixing belt, characterised in that the position of at least one weighing container transverse to the longitudinal extent of the mixing belt can be adjusted.

BRIEF DESCRIPTION OF THE DRAWINGS

FIG. 6 shows a second embodiment of the displacement device for the weighing container having a pneumatic displacing device, FIG. 7 shows a third embodiment of the displacement device for the weighing container having an electromotive displacing device.

DETAILED DESCRIPTION OF PREFERRED EMBODIMENTS

Figure 1:
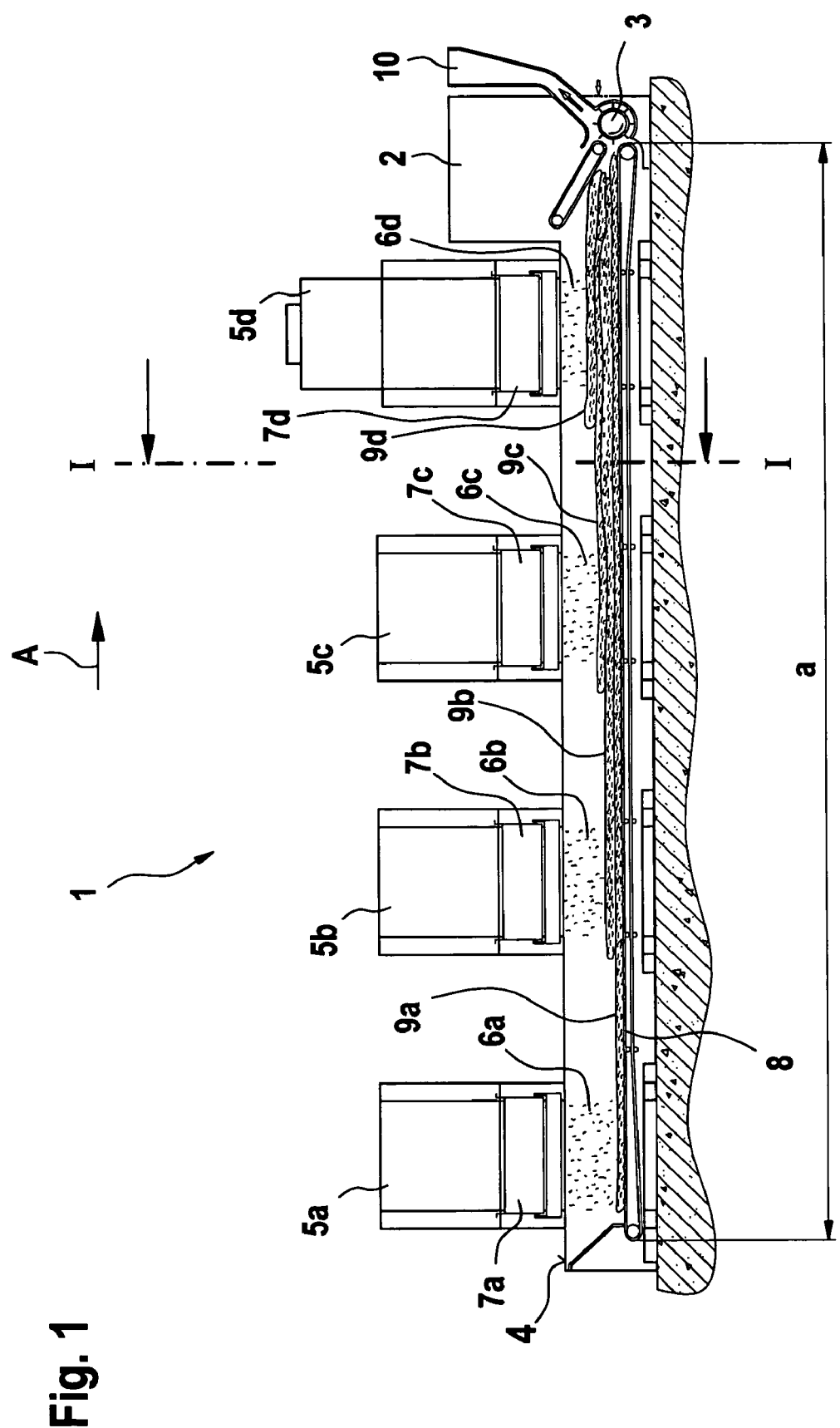
FIG. 1 is a diagrammatic view of a fibre-mixing system having four weighing feeders, a mixing belt and an opener roller.

With reference to FIG. 1, a flock-mixing system 1 according to FIG. 1 consists of a flock mixer 2 having a high-speed opener roller 3 and a mixing table 4. The mixing table 4 is located below the weighing bale openers 5a, 5b, 5c, 5d, and the flock mixer 2 is located at the end of the mixing table 4. The weighing bale openers 5a, 5b, 5c, 5d each include a respective weighing container 7a, 7b, 7c, 7d. Between the discharges 6a, 6b, 6c, 6d (fibre components) of the weighing containers 7a, 7b, 7c, 7d, the conveyor belt 8 of the mixing table 4 continues in the direction of the opener 2 only by the width of a weighing container 7a to 7d. As a result, the individual discharges 6a to 6d of each weighing container 7a to 7d produce unbroken layers of fibre material 9a, 9b, 9c, 9d lying one on top of the other. The conveyor belt 8 conveys the superposed fibre layers 9a to 9d of the mixture components to the flock mixer 2 (opener). Material is discharged from each of the weighing containers 7a to 7d in such a manner that the components to be mixed are layered one above the other and are at the same time conveyed to the intake into the mixing opener 2. First, the weighing feeder 5a discharges its fibre component portion onto the mixing belt 8, which transports that layer 9a to weighing feeder 5b, where the next component is deposited from weighing container 7b onto the layer 9a from weighing feeder 5a and the two layers are transported further to weighing feeder 5c which then deposits the third component 6c onto the two layers 9a and 9b. Finally, from the weighing container 7d of weighing feeder 5d, the fibre material component 6d is deposited onto the layers already present. All four layers 9a to 9d pass underneath a pressing roller at the end of the conveyor belt 8 and are supplied by two slow-speed feed rollers to the mixing opener 2 which continuously mixes the stack of layers and passes it on to a further processing machine through pipeline 10. Reference letter a denotes the longitudinal extent (lengthwise alignment) of the mixing belt 8. Reference letter A denotes the operating direction which corresponds to the direction of travel of the upper belt portion 8a of the conveyor belt 8.

Figure 2:
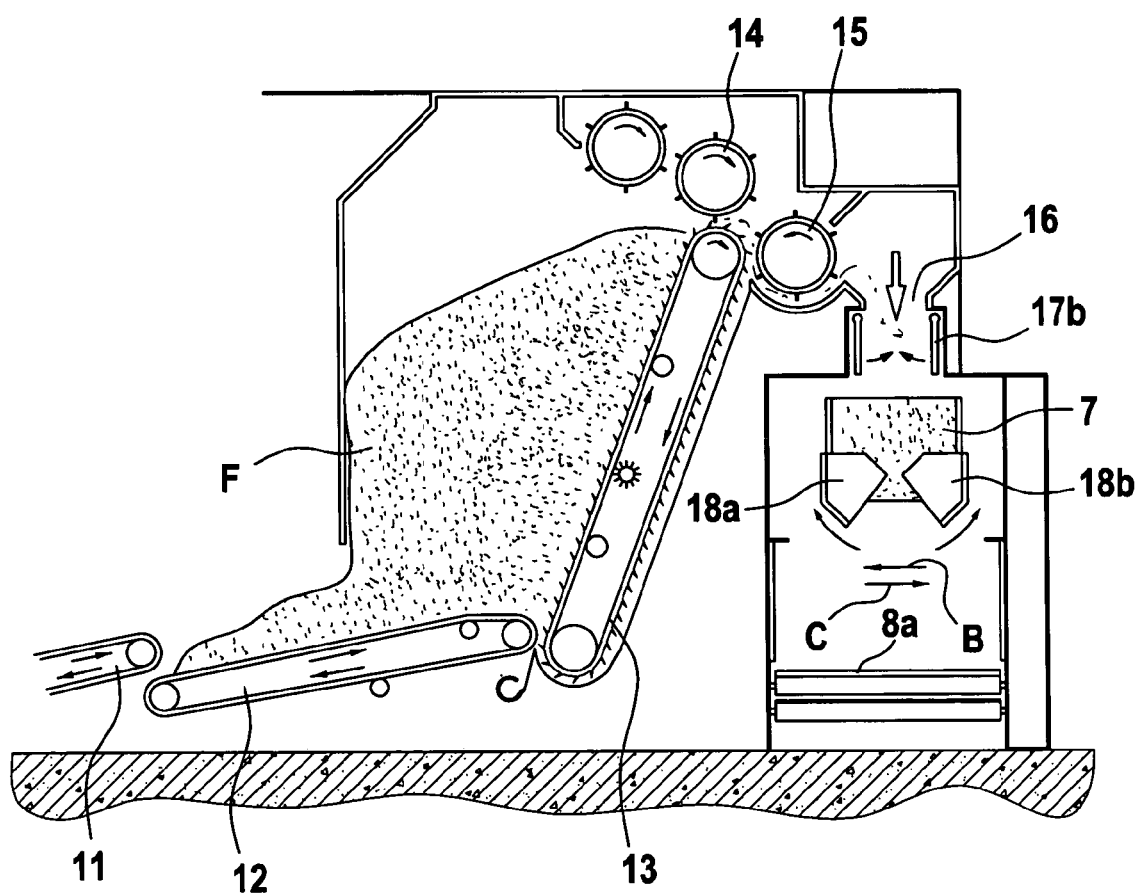
FIG. 2 is a side view of a weighing bale opener with a weighing container above the mixing belt.

The weighing bale opener according to FIG. 2 has a support table 11 for fibre bales or the like and a feed table 12 which conveys the fibre material F to the obliquely ascending needle table 13 which carries the fibre material upwards. The evening roller 14 throws excess flocks onto the material F, which has collected on the feed table 12, the component being mixed into itself. The high-speed stripper roller 15 combs the flocks from the needle table 13 and throws them into the pre-filling chamber 16 from which they fall into the weighing container 7. The pre-filling chamber 16 is closable at its lower end by two pivotally mounted closing flaps 17a, 17b (in FIG. 2 the closing flaps 17a, 17b are shown in their open position). The weighing container 7 is closable at its lower end by two pivotally mounted base flaps 18a, 18b (in FIG. 2 the base flaps 18a, 18b are shown in the open position). The mixing belt 8 passes below the weighing container 7, the fibres weighed out in the weighing container 7 being discharged onto the upper belt portion 8a of the mixing belt 8. The weighing container 7 can be displaced in the direction of arrows B and C. Reference letter b denotes the transverse extent (transverse direction) of the mixing belt 8.

Figure 3A:
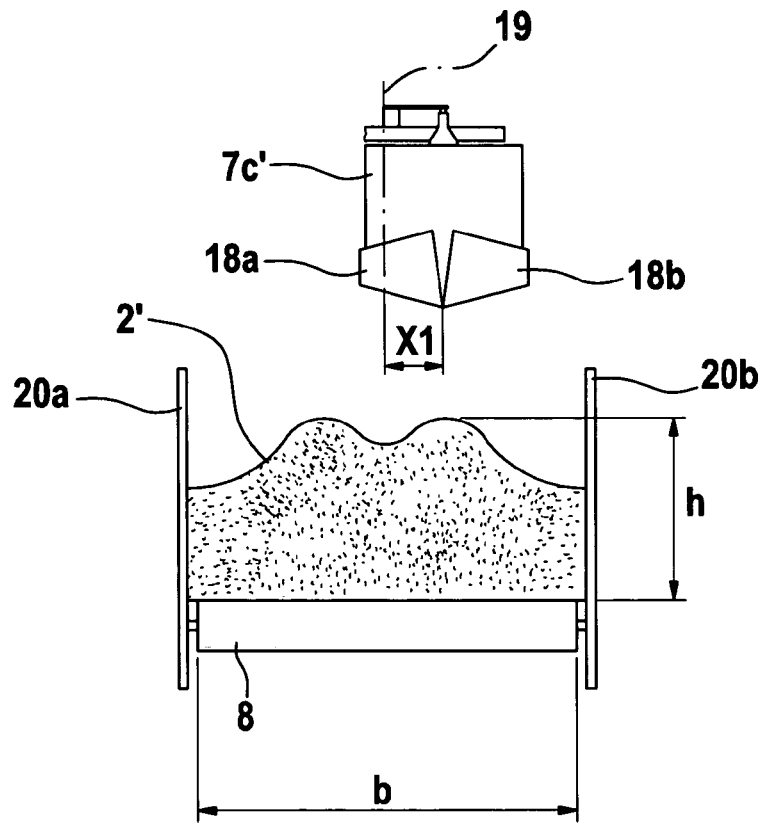
FIG. 3a shows the weighing container in a first position above the mixing belt.
Figure 3B:
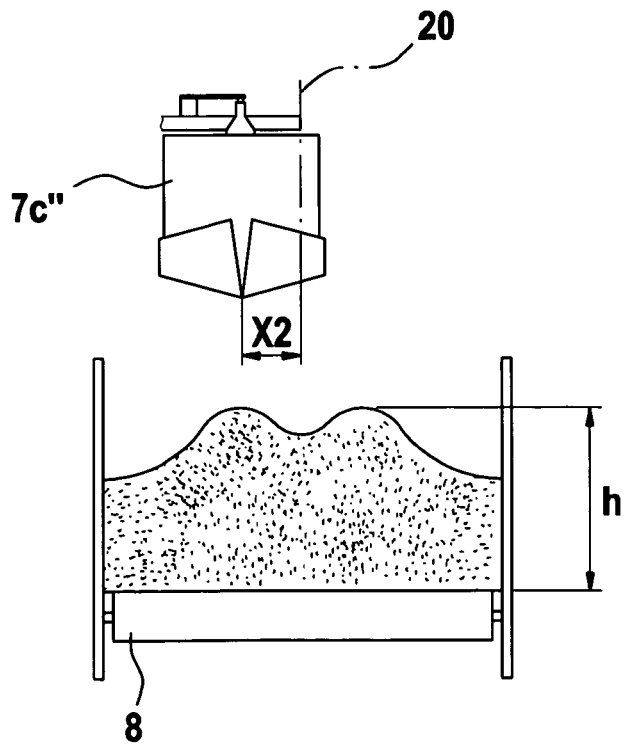
FIG. 3b shows the weighing container in a second position above the mixing belt.

In FIGS. 3a and 3b the weighing container 7c is shown in two positions 7c' and 7c'' above the mixing belt 8, which positions are assumed one after the other. Reference numeral 19 denotes a centre line in respect of the width b of the conveyor belt 8. According to FIG. 3a, at timepoint $t_1$ the centre of the weighing container 7c' is located at distance $x_1$ from the centre line 19, and according to FIG. 3b at timepoint $t_2$ the centre of weighing container 7c'' is located at distance $x_2$ from the centre line 19. In this way the material cone of the weighing container 7c is located to the right, according to FIG. 3a, and to the left, according to FIG. 3b, of the centre line 19. The respective other material cone originates from another weighing container, for example weighing container 7b. Reference numerals 20a, 20b denote side walls, and reference numeral 21 denotes the discharged fibre material.

Figure 4:
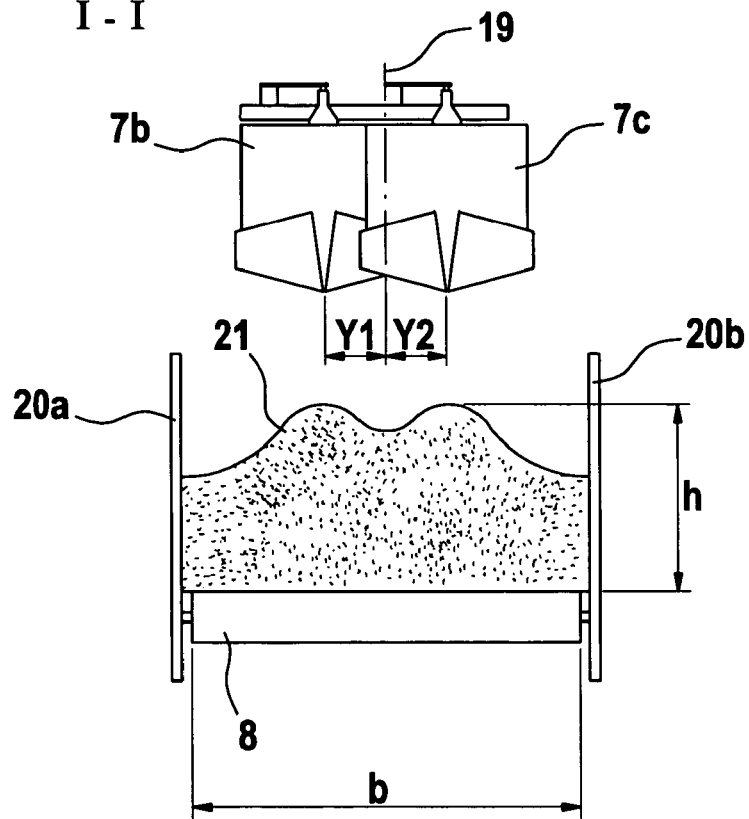
FIG. 4 is a side view in section I-I according to FIG. 1 with two weighing containers in different positions.

In FIG. 4 the weighing containers 7b and 7c are each shown in a specific position above the mixing belt 8 at the same timepoint $t_o$. The centre of the weighing container 7b is located at distance $y_1$ from the centre line 19, and the centre of the weighing container 7c is located at distance $Y_2$ from the centre line 19. In this way, the material cones of the weighing containers 7b and 7c are located on different sides of the centre line 19.

An important point lies in the position of the weighing containers 7 being adjustable in dependence on the mixing ratios (e.g. 50:25:25). For example, for a desired mass ratio 50%:25%:25% of three different fibre material components, weighing container 7a could be positioned at distance $y_1$ (25%), weighing container 7b at distance $y_1$ (25%) and weighing container 7c (50%) at distance $y_2$ from the centre line 19.

Figure 5:
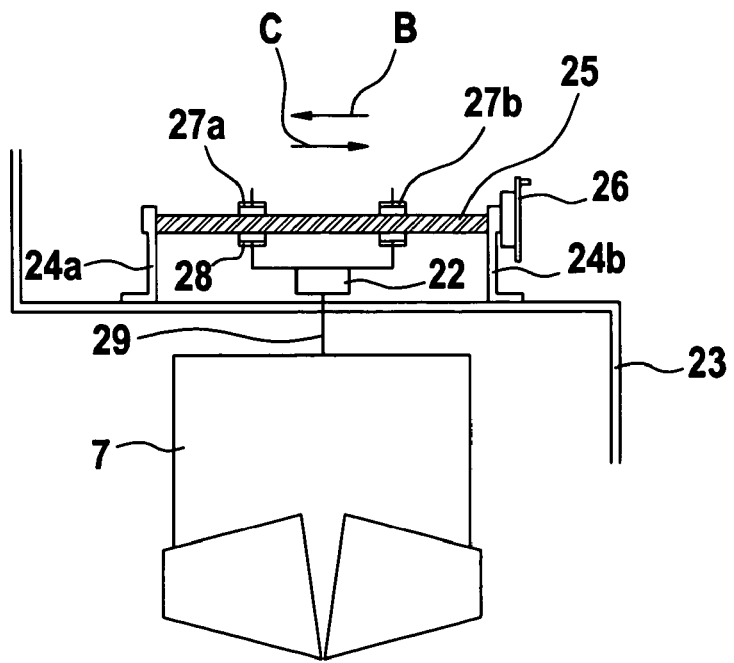
FIG. 5 shows a first embodiment of the displacement device for the weighing container having a mechanical displacing device.

In accordance with FIG. 5, a mechanical displacement device 39 is provided for the weighing container 7 with the weighing cell 22 (measuring cell for weight registration). Above the weighing container 7 there are mounted on the machine frame 23 two holding elements 24a, 24b which carry a threaded spindle 25 having a rotatable hand wheel 26. Two threaded nuts 27a, 27b cooperate with the threaded spindle 25 and are rigidly coupled to one another by means of a connecting bar 28. The weighing cell 22, from which the weighing container 7 is suspended by means of a holding member 29, is mounted on the connecting bar 28. When the hand wheel 26 is rotated, the weighing container 7 is shifted in direction B or C.

According to FIG. 6, there is a pneumatic displacement device 40 for the weighing container 7 with the weighing cell 22. The holding elements 24a, 24b carry a straight rod 30, on which two sliding sleeves 31a, 31b slide, which sliding sleeves are rigidly coupled to one another by means of the connecting bar 28. The end of the piston rod 32a of a pneumatic cylinder 32 is articulated on the sliding sleeve 31b. A three-position cylinder is used which can travel to the left-hand end position, the centre position and the right-hand end position. The rod 30, the sliding sleeves 31a, 31b and the connecting bar 28 form a linear guide. On displacement of the piston 32b with the piston rod 32a, the weighing container 7 with the weighing cell 22 is shifted in direction B or C.

FIG. 7 shows stepless adjustment using a motor drive means. An actual value feedback from the electric drive motor 32 is provided (see FIG. 8) so that the weighing containers can be moved to exactly preselected positions by way of the system control means (see FIG. 8). The drive motor 32 can be, for example, a geared motor. The linear guide corresponds to that according to FIG. 7, to which reference is made. The two open ends of a toothed belt 33 are attached to the sliding sleeves 31a, 31b, which toothed belt circulates around two toothed belt wheels 34a, 34b. The toothed belt wheel 34b and a further toothed belt wheel 36 (not shown) are attached to a common shaft 35b. A continuous toothed belt 37 circulates around the toothed belt wheel 36 and the drive shaft 38 of the drive motor 32. On rotation of the drive shaft 38, the weighing container 7 with the weighing cell 22 is shifted in direction B or C. Reference numeral 41 denotes the electromotive displacement device.

Figure 8:
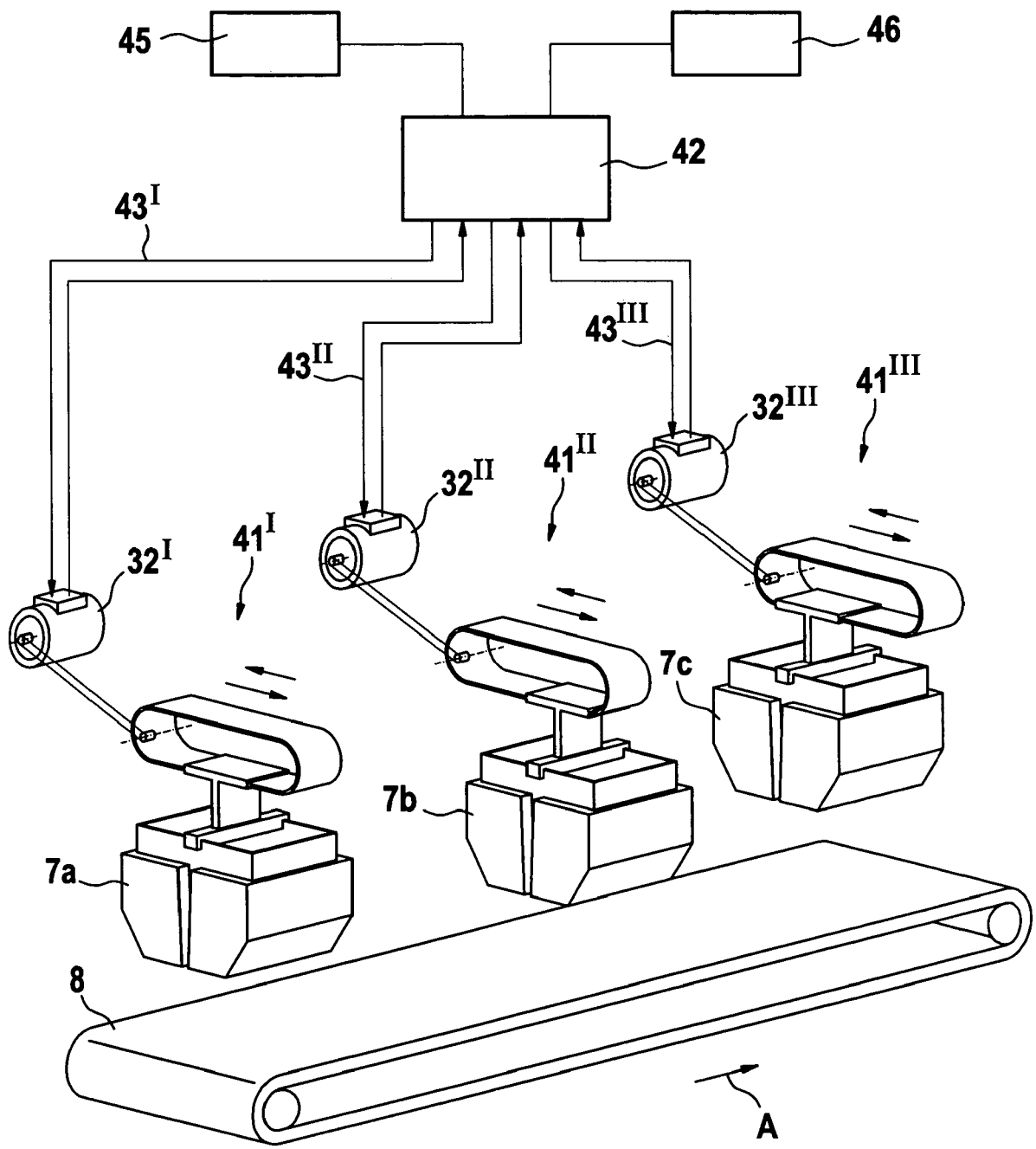
FIG. 8 is a block circuit diagram of an electrical controlling and regulating device having three connected controllable electromotive displacing devices for displacement of the associated weighing devices.

In accordance with FIG. 8, the positions of the weighing containers 7a, 7b and 7c, each with weighing cells, can be adjusted automatically. From the specified proportions by weight of the different fibre material components a control means effects optimum distribution of fibre material on the mixing belt 8 in dependence upon the preselected proportions by weight. Above the mixing belt 8, three weighing containers 7a, 7b and 7c are mounted, one after another in the operating direction A, on electromotive displacement devices 41', 41" and 41"' (see FIG. 7). The drive motors 32', 32" and 32"' are connected by electrical lines to an electronic controlling and regulating device 42, for example a microcomputer. By way of lines 43', 43", 43"', the electrical control signals for the drive motors 32', 32" and 32"', respectively, are transmitted in accordance with a specified desired value. By way of lines 44', 44" and 44"', the electrical signals for the actual value (positions) are transmitted (fed back) from the drive motors 32', 32"'and 32"', respectively. The proportions by weight of the individual fibre material components are specified by means of an input device 45, for example a keyboard or the like. Reference numeral 46 denotes a memory unit into which the positions of the weighing containers 7a, 7b, 7c for a certain mixing ratio can be input and stored, so that when the same mixture is being processed the setting can be called up from the memory 46 and implemented.

Although the foregoing invention has been described in detail by way of illustration and example for purposes of understanding, it will be obvious that changes and modifications may be practised within the scope of the appended claims.

The invention claimed is:

1. A fibre mixing system comprising
   a traveling mixing belt; and
   at least two weighing containers, arranged one after the other in a direction of travel of the belt, for delivering weighed fibre material onto the belt;
   wherein the position of at least one of said weighing containers in a transverse direction relative to the direction of travel of the belt can be adjusted.

2. A system according to claim 1, in which the position of at least one weighing container can be adjusted in the transverse direction.

3. A system according to claim 1, in which the position of each weighing container can be adjusted relative to the mixing belt.

4. A system according to claim 1, in which the position of the weighing container(s) can be adjusted in dependence upon a parameter selected from the group consisting of:
   the mixing ratio of the fibre components;
   the proportions of the fibre components;
   the mass of the fibre components;
   the number of weighing containers.

5. A system according to claim 1, in which the mixing belt is in a fixed position.

6. A system according to claim 1, in which the at least two weighing containers can be moved back and forth above the mixing belt.

7. A system according to claim 1, in which the at least two weighing containers are displaceable parallel to the surface of the mixing belt.

8. A system according to claim 1, in which each weighing container comprises a position-measuring element.

9. A system according to claim 1, in which, for displacing each of the at least two weighing containers, each weighing container is associated with at least one parallel guide.

10. A system according to claim 9, in which the parallel guide includes guide components associated with side walls of the weighing container that are located opposite one another.

11. A system according to claim 10, in which the guide components are coupled to one another by a synchronisation shaft.

12. A system according to claim 10, in which the guide components comprise at least one pressure cylinder.

13. A system according to claim 10, in which the guide components each have a traction mechanism.

14. A system according to claim 13, in which the traction mechanism is a chain or belt, which circulates around two rotatable elements.

15. A system according to claim 14, in which the rotatable elements are guide rollers or wheels.

16. A system according to claim 1, in which, for displacing each of the at least two weighing containers, each weighing container is associated with at least one drive device.

17. A system according to claim 16, comprising a manual drive device.

18. A system according to claim 16, comprising at least one motor drive device for displacing one or more weighing containers.

19. A system according to claim 16, comprising a device for generating actual value feedback from the at least one drive device.

20. A system according to claim 19, in which the actual value feedback is a cam plate having an inductive proximity switch.

21. A system according to claim 16, in which the at least one drive device is connected to an electronic controlling and regulating device.

22. A system according to claim 21, in which each weighing device is associated with a position-measuring element, the position-measuring elements being connected to the controlling and regulating device.

23. A system according to claim 21, in which the controlling and regulating device is able to calculate the position of the weighing containers from the proportions by weight of the fibre components and the number of weighing devices.

24. A system according to claim 21, in which the controlling and regulating device is able to output electrical signals to the drive devices for setting the position of the weighing container(s).

25. A system according to claim 1, wherein each weighing container is associated with at least one weighing cell, and the weighing container can be displaced together with the at least one weighing cell.

26. A system according to claim 1, in which, on altering the mixing ratio of the fibre components, the position of the weighing containers can be adjusted.

27. A system according to claim 1, in which a selectable off-centre position for the at least one weighing container is provided.

28. A system according to claim 1, in which the mixing belt is associated with at least two weighing bale openers.

29. A system according to claim 1, in which the mixing belt is associated with at least two pneumatically fed weighing feeders.

30. A fibre mixing system comprising
a mixing belt arranged to travel in a first, longitudinal direction; and
at least two weighing containers arranged consecutively in said longitudinal direction for delivery of weighed fibre material onto the belt;
at least one of said weighing containers comprising an adjustment device for adjusting the position of said at least one weighing container in a second direction, transverse to said longitudinal direction.

* * * * *